(12) United States Patent
Ollila et al.

(10) Patent No.: US 6,332,367 B1
(45) Date of Patent: *Dec. 25, 2001

(54) DUAL LOOP CORIOLIS EFFECT MASS FLOWMETER

(75) Inventors: Curtis John Ollila, Westminster; David Frederick Normen, Louisville; Ernest Dale Lister, Westminster, all of CO (US)

(73) Assignee: Micro Motion, Inc., Boulder, CO (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/814,203

(22) Filed: Mar. 11, 1997

(51) Int. Cl.[7] ........................................................ G01F 1/78
(52) U.S. Cl. .................................. 73/861.357; 73/861.355
(58) Field of Search ........................ 73/861.355, 861.356, 73/861.357

(56) References Cited

U.S. PATENT DOCUMENTS

| | | | |
|---|---|---|---|
| 4,127,028 | * 11/1978 | Cox et al. | 73/861.355 |
| 4,311,054 | 1/1982 | Cox et al. | |
| 4,825,705 | * 5/1989 | Hohlock et al. | 73/861.355 |
| 5,078,014 | * 1/1992 | Lew | 73/861.355 |
| 5,349,872 | * 9/1994 | Kalotay et al. | 73/861.355 |
| 5,357,811 | * 10/1994 | Hoang | 73/861.355 |
| 5,400,653 | * 3/1995 | Kalotay | 73/861.355 |
| 5,425,277 | * 6/1995 | Lew | 73/861.355 |

FOREIGN PATENT DOCUMENTS

| | | |
|---|---|---|
| 0 271 605 A1 | 10/1986 | (DE) . |
| 0 361 388 A2 | 9/1989 | (DE) . |
| 38 29 058 A1 | 3/1990 | (DE) . |
| 0 421 812 A1 | 10/1990 | (GB) . |
| 0462 711 A1 | 5/1991 | (GB) . |
| WO 90/15310 | 12/1990 | (WO) . |
| WO 96/02812 | 2/1996 | (WO) . |

* cited by examiner

Primary Examiner—Ronald L. Biegel
Assistant Examiner—Jewel Thompson
(74) Attorney, Agent, or Firm—Duft, Graziano & Forest, P.C.

(57) ABSTRACT

An apparatus for measuring the flow rate of a fluid flowing through a minimal flow pipeline with a Coriolis effect mass flowmeter. The flowmeter has a single flow tube with two loops. The loops are connected by a cross-over section. A driver oscillates the loops and the phase difference between the ends of the loops is measured. The measured phase difference is then used to find the flow rate of the fluid. The flow tube is fixedly attached to an anchor which is, in turn, attached to a housing. The anchor separate the vibrating, dynamic portion of the flowmeter from the non-vibrating portion of the flowmeter.

20 Claims, 6 Drawing Sheets

DUAL LOOP CORIOLIS EFFECT MASS FLOWMETER

FIELD OF THE INVENTION

This invention relates to an apparatus for using a Coriolis mass flowmeter what a serial, dual loop, flow tube for measuring the flow rate of a fluid through a pipeline. More particularly, the invention relates to the element used to connect the two loops of the flow tube. Still more particularly, the invention relates to an anchor which connects a flow tube to a flow tube housing

PROBLEM

It is known to use Coriolis effect mass flowmeters to measure mass flow and other information of materials flowing through a pipeline as disclosed in U.S. Pat. No. 4,491,025 issued to J. E. Smith, et al. of Jan. 1, 1985 and U.S. Pat. No. Re. 31,450 to J. E. Smith of Feb. 11, 1982. These flowmeters have one or more flow tubes of a curved configuration. Each flow tube configuration in a Coriolis mass flowmeter has a set of natural vibration modes, which may be of a simple bending torsional, or coupled type. Each flow tube is driven to oscillate at resonance in one of these natural modes. The natural vibration modes of the vibrating, material filled system are defined in part by the combined mass of the flow tubes and the material within the flow tubes. Material flows into the flowmeter from a connected pipeline on the inlet side of the flowmeter. The material is then directed through the flow tube or flow tubes and exits the flowmeter to a pipeline connected on the outlet side.

A driver applies force to oscillate the flow tube. When there is no flow through the flowmeter, all points along a flow tube oscillate with an identical phase. As the material begins to flow, Coriolis accelerations cause each point along the flow tube to have a different phase with respect to other points along the flow tube. The phase on the inlet side of the flow tube lags the driver, while the phase on the outlet side leads the driver. Sensors are placed on the flow tube to produce sinusoidal signals representative of the motion of the flow tube. The phase difference between the two sensor signals is proportional to the mass flow rate of the material flowing through the flow tube or flow tubes.

Material flow though a flow tube creates only a slight phase difference on the order of several degrees between the inlet and outlet ends of an oscillating flow tube. When expressed in terms of a time difference measurement, the phase difference induced by material flow is on the order of tens of microseconds down to nanoseconds. Typically, a commercial flow rate measurement should have an error of less the 1%. Therefore, a Coriolis flowmeter must be uniquely designed to accurately measure these slight phase differences.

It is known to use a single loop, serial path flow tube to measure the rate of fluid flowing through a pipeline. However, the single loop, serial flow tube design has a disadvantage in that it is inherently unbalanced. A single loop, serial flow Coriolis flowmeter has a single curved tube or loop extending in cantilever fashion from a solid mount. Dual loop Coriolis flowmeters are balanced. A dual loop Coriolis flowmeter has two parallel, curved tubes or loops extending from a solid mount. The parallel flow tubes are driven to oscillate in opposition to one another with the vibrating force of one flow tube canceling out the vibration force of the other flow tube. The result is that in a properly constructed dual loop Coriolis flowmeter there are no flowmeter induced vibrations at the points of attachment between the flowmeter and the pipeline. This is called a "balanced" flowmeter. The absence of vibrations allows dual looped Coriolis flowmeter to be attached free standing to a pipeline. A single loop, serial path Coriolis flowmeter must be secured firmly to a support against which the flow tube can vibrate. The use of a support renders the use of a single loop, serial flow tube design impractical in most industrial applications because the serial flow tube requires that the pipeline be near an object that could be used as a support. Therefore, the dual loop flowmeter designs are desirable.

It is a particular problem to measure minimal flow rates of materials flowing through a pipeline. A mass flow rate through a pipeline of less than or substantially equal to 4 lbs. per minute is considered minimal for commercial applications. A Coriolis mass flowmeter measuring such small flow rates must be formed of relatively small components including tubes and manifolds. These relatively small components present a variety of challenges in the manufacturing process including but not limited to difficult welding processes.

One solution for measuring minimal flow rates has been to use a single loop, serial flow tube Coriolis effect mass flowmeter. Single loop, serial flow tube Coriolis flowmeters have certain advantages. The flow tube has a larger diameter which reduces pressure drop across the flowmeter. No manifold is necessary to split the flow into two tubes. The larger flow tube is easier to draw and weld. There are also other advantages. The problem is that single loop, serial flow tube flowmeters cannot be mounted free standing into the pipeline since they are not balanced flowmeters.

Dual loop, parallel flow tube flowmeters can be mounted freestanding into the pipeline. However, the small size necessary for measuring minimal flow rates creates design and manufacture problems for use of the dual loop, parallel flow tube design. These problems limit the industrial applications of dual loop, dual tube Coriolis flowmeters for measuring minimal flow rates.

A particular problem with dual loop, parallel flow tube design is that a manifold must be used to direct the flow entering the inlet end of the flowmeter in order to divide the flow so that it enters the two flow tubes. It is difficult to produce a manifold, by casting or otherwise, in the small dimensions necessary to measure a minimal flow rate. Also, the manifold increases pressure drop across the flowmeter. Further, the flow tubes must be welded or brazed onto the manifold. It is difficult too weld very thin walled tubing. The welds and joints do not provide the smooth surface needed for sanitary applications of the flowmeter. Sanitary applications demand a continuous, smooth flow tube surface that does not promote adhesion of material to the walls of the flow tube. Further, the additional welds that are necessary reduce the manufacturing yield. Therefore, the use of a manifold is not desired in flowmeters designed for measuring minimal flow rates.

The smaller diameters of the dual flow tubes make the tubes more prone to plugging. The smaller diameter is needed to assure a sufficient flow rate through the flow tubes. Material is more likely to plug the flow path through these flow tubes because smaller particles in the material can obstruct the smaller flow path. These obstructions can cause inaccurate readings of the flow rate and breakage of the flow tube. Therefore, the dual flow tube design does not offer a satisfactory solution for measuring minimal flow rates.

A further problem is that sometimes a Coriolis flowmeter is used to measure flow through a pipeline where the flowing material is pressurized. If a flow tube cracks, the pressured material will rapidly spray from the highly pressurized flow tube to the outside surroundings which have a lower pressure than the flow tube. The pressurized material spraying from the flow tube can damage the pipeline or surrounding structures.

SOLUTION

The above and other problems are solved by the apparatus of the present invention that comprises a dual loop, serial path flow tube. Each of the loops is oriented in a plane parallel to the plane containing the other loop. The flow tube is enclosed in a housing to which the flow tube is connected through an anchor. The housing can be configured to contain the leakage of pressurized materials from a break in the flow tube. These advantages allow the present invention to be used to measure the flow rates, including minimal flow rates, of material flowing through the pipeline.

In the present invention, the dual loops in the serial flow tube are connected by a crossover section. The outlet end of the first loop connects to an inlet end of the crossover section in the plane containing the first loop. The inlet end of the second loop connects to an outlet end of the crossover section in the plane of the second loop. The crossover section of the flow tube allows the present invention to have the advantages of both serial and parallel flow tube designs for measuring minimal flow rates.

The present invention has a serial flow tube. Serial flow tube and parallel flow tube flowmeters each have advantages and disadvantages. For the same tube parameters, i.e. inside tube diameter, tube wall thickness, and tube geometry, an oscillating serial flow tube generates more Coriolis force than an oscillating parallel flow tube since all the flow passes through each portion of a serial flow tube instead of only half of the flow passing through each portion of a parallel flow tube. The disadvantage of a serial flow tube is that the pressure drop through a serial flow tube is higher than for a parallel flow tube with the same tube parameters. To reduce pressure drop, a sensor with a serial flow tube typically uses a larger diameter and proportionally thicker flow tube wall to achieve substantially the same pressure drop of a parallel flow tube flowmeter. Therefore, serial path Coriolis flowmeters are inherently larger than parallel path flowmeters. Generally this is a disadvantage for Coriolis flowmeters. However, for minimal flow rate sensors it is an advantage. A flow tube with a greater diameter reduces the probability of particles plugging the flow tube. The joining, by welding or brazing, of a relatively larger diameter, heavier wall flow tube make the flowmeter design of the present invention easier to produce and better suited for sanitary applications. Therefore the flowmeter of the present invention can be used for industrial applications in which a typical dual loop, parallel flow flowmeter cannot be used.

The present invention is also an improvement over the dual loop, parallel flow tube flowmeters because the present invention does not need a manifold. Manifolds are needed in dual flow tube designs to divide the flow entering the flowmeter into the two flow tubes. Since the present invention has a serial flow tube, a manifold is not needed to divide the flow. Thus, the flow tube of the present invention is easier to weld as there are fewer welds.

The two loops of the flow tube of the present invention are oscillated in opposition to one another. Vibrations caused by the oscillation of the loops are canceled out and do not affect the ends of the flowmeter. Therefore, the flowmeter of the present invention is balanced and does not have to be attached to a support. Thus, the flowmeter of the present invention may be attached freestanding in a pipeline without mounting the flowmeter to a support.

The flow tube of the present invention is secured, near the crossover section, by an anchor. The anchor is the solid mounting from which the dual loops of the flow tube extend in cantilever fashion. The anchor is fixed to a flowmeter housing. The inlet and outlet of the flow tube are connected to the housing through an adapter which transitions the fluid from the flow tube to a process connection. The process connections are flanges or the like for connecting the flow tube to the process pipeline. Therefore the flow tube, anchor, and housing share a common physical reference. The housing can be designed to contain the leakage of a pressurized fluid in the case breakage of the flow tube. The anchor connected to the housing and flow tube holds the flow tube securely in place with enough room to oscillate freely inside the housing. The anchor is used to attach the flow tube to the housing to minimize the effect of distortions of the flow tube that would be caused if the flow tube were attached directly to the housing with welds. Also the anchor decouples the vibrating portion of the flowmeter, above the anchor, from the non-vibrating portion of the flowmeter where the flowmeter attaches to the pipeline.

The inlet and outlet portions of the flow tube of the present invention can be formed to any desirable configuration. For example the inlet and outlet portions of the flow tube can be formed in-line with each other or the meter can be made self-draining by forming them in a spiral, off-set configuration.

The modular design of the flowmeter of the present invention makes it relatively easy for the designer to make changes to the wetted components of the flow tube. Since the fluid only contacts the flow tube and the adapters, the housing and anchor can be used with flow tubes and adapters of different materials without necessarily making any further design changes.

The apparatus of the present invention has the above described and other advantages in measuring the flow rate of material flowing through pipelines. Unlike traditional Coriolis flowmeters, the present invention has a serial, balanced flow tube. A crossover section in the flow tube connects two loops in the flow tube. The configuration of the serial flow tube allows the present invention to behave like a dual flow tube flowmeter, while having serial flow tube characteristics. The anchor and housing configuration provide support for the flow tube and minimize distortion of the flow tube.

DETAILED DESCRIPTION
Flow Tube Geometry—FIGS. 1–4

Figure 1:
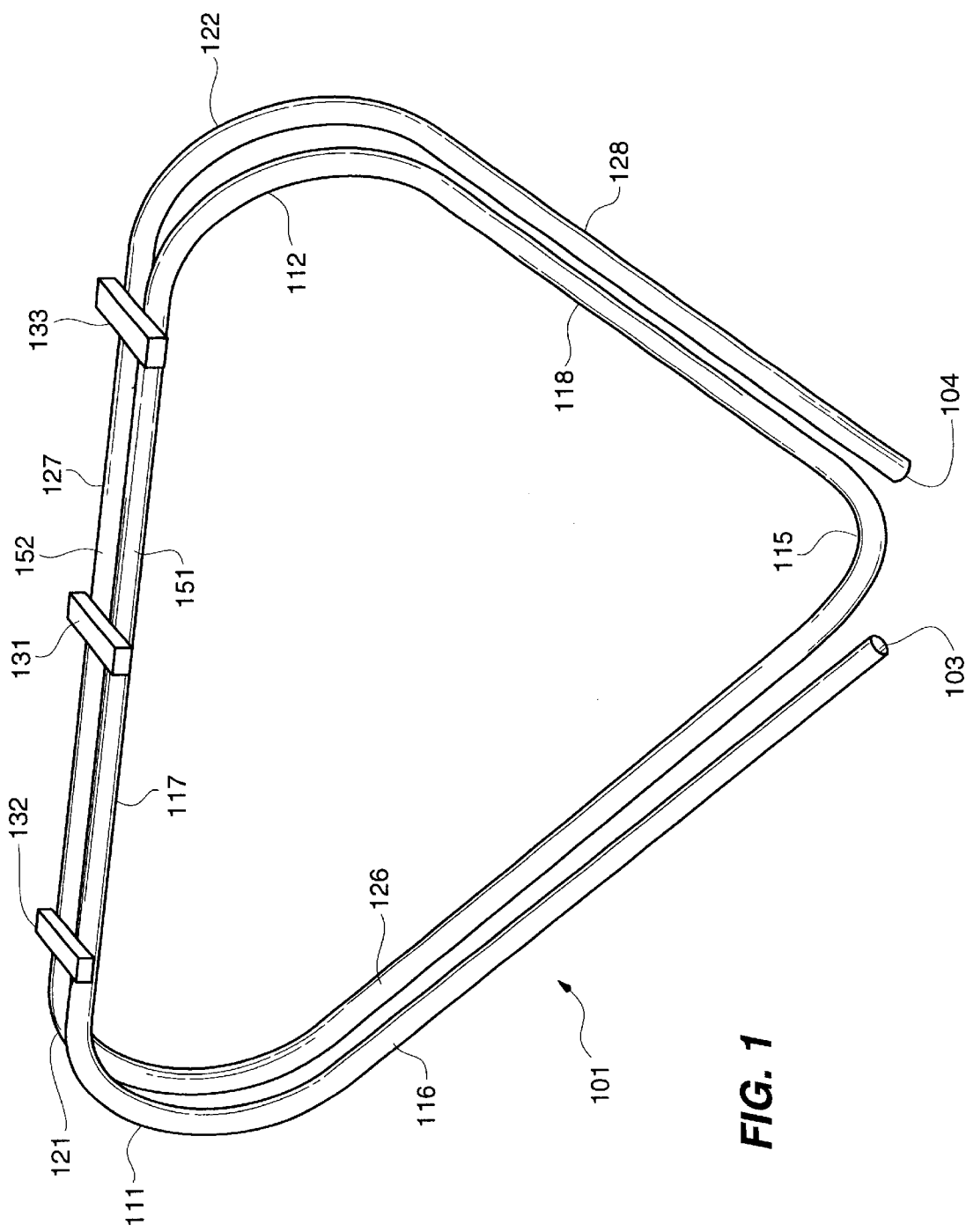
FIG. 1 discloses a flow tube with a crossover section of the present invention.

A basic embodiment of the flow tube 101 of the present invention is illustrated in FIG. 1. Inlet 103 of serial flow tube 101 attaches to a pipeline and receives a flowing material from the pipeline. Outlet 104 attaches to the pipeline to return the flowing material to the pipeline. Serial flow tube 101 has two loops 151 and 152. Crossover section 115 joins loops 151 and 152 to form one continuous flow tube 101.

Figure 3:
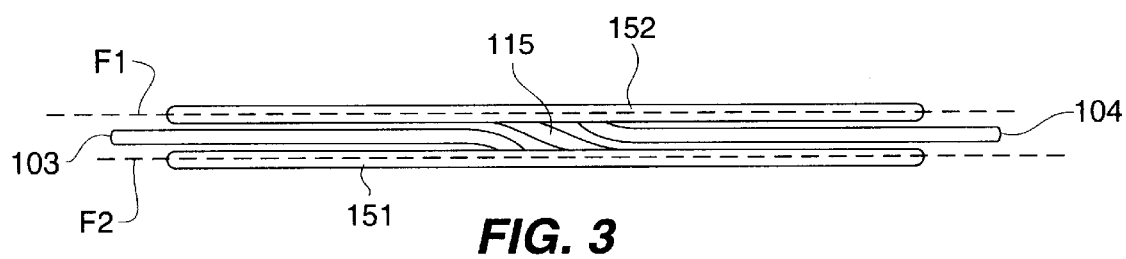
FIG. 3 discloses a top-side view the flow tube of the present invention.

FIG. 3 illustrates a top view of flow tube 101. Elements common between any of the FIGS. are referenced by common reference numerals. Flow tube loop 151 is oriented in plane F1 and flow tube loop 152 is oriented in plane F2. Planes F1 and F2 are parallel. Crossover section 115 has a first end in plane F1, where it is attached to loop 151. The middle section of crossover section 115 traverses from plane F1 to plane F2. Crossover section 115 then has a second end connected to loop 152 in plane F2. One continuous flow tube 101 is produced by the connection of loops 151 and 152 by crossover section 115.

Crossover section 115 is an important element of continuous flow tube 101. Crossover section 115 eliminates the need for the manifold by forming the flow tube itself to conduct the fluid from loop 151 to 152. Serial flow tube 101 is continuous and provides a smooth tube surface required for sanitary applications.

A drive coil 131 is mounted at a midpoint region of flow tube loops 151 and 152 to oscillate loops 151 and 152 in opposition to each other. Left pick-off sensor 132 and right pick-off sensor 133 are mounted in the respective corners of the top sections of flow tube loops 151 and 152. Sensor 132 and 133 sense the relative velocity of flow tube loops 151 and 152 during oscillations.

In the embodiment of FIG. 1, loops 151 and 152 are substantially triangular shaped. Loops 151 and 152 of the flow tube contain bends 111, 112, 121, and 122. Each of the bends 111, 112, 121, and 122 is substantially 135-degrees. Straight sections 116, 117, 118, 126, 127, and 128 connect to bends 111, 112, and 121, and 122. Straight sections 116 and 118 of loop 151 and straight sections 126 and 128 of loop 152 are nonparallel and aligned substantially 90 degrees from each other along their longitudinal axis. Crossover section 115 connects straight section 118 on the right side of loop 151 to straight section 126 on the left side of loop 152. The complex bend of crossover section 115 connects loops 151 and loops 152 so that material flows in the same direction through each loop.

Figure 2:
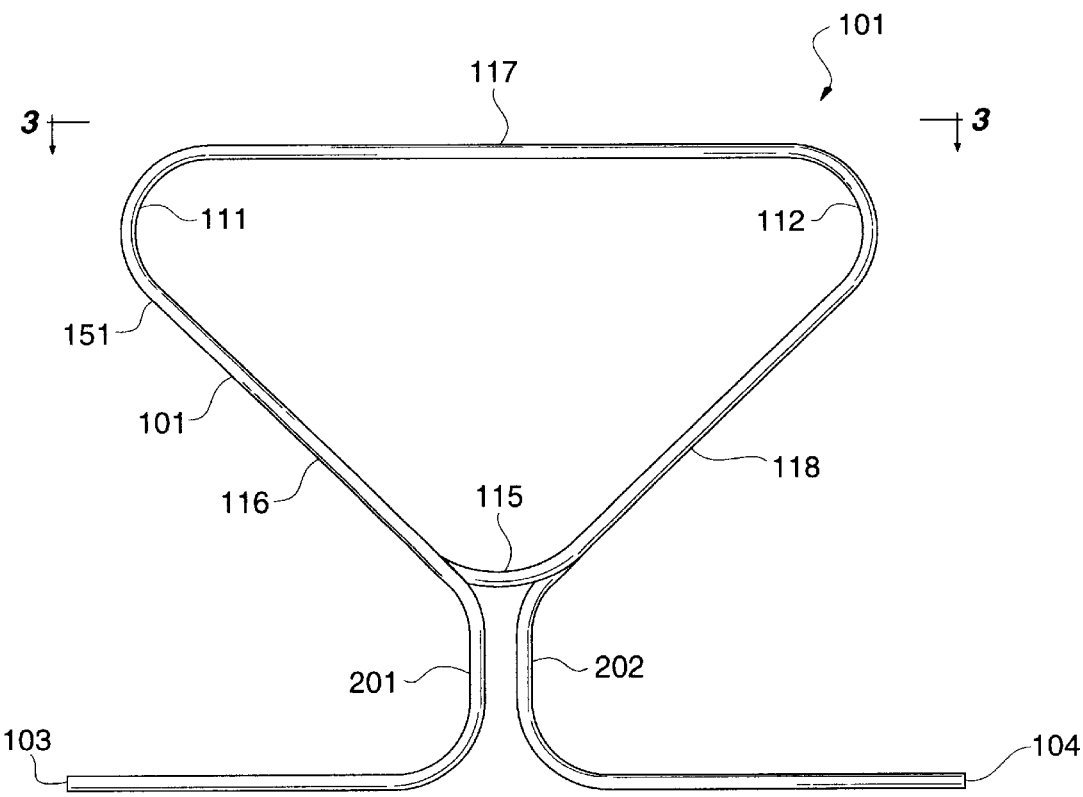
FIG. 2 discloses a flow tube with the shape of the preferred embodiment of the invention.

FIG. 2 illustrates the shape of the serial flow tube 101 of the preferred embodiment of the present invention. Flow tube 101 has all of the elements depicted in FIG. 1 with the additional elements of inlet bend 201 and outlet bend 202. Inlet 103 and outlet 104 are planar with a pipeline (not shown) and are not co-planar with either plane F1 or F2. ( See FIG. 3) Inlet bend 201 attaches inlet 103 with loop 151 by crossing from inlet 103 to plane F1 and connecting to section 118. An outlet bend 202 joins outlet 104 and loop 152 by crossing from outlet 104 to plane F2 and connecting with section 128. The inlet and outlet bends allow Coriolis flowmeter 101 to be attached to the pipeline while the two loops are not planar with the pipeline.

Figure 4:
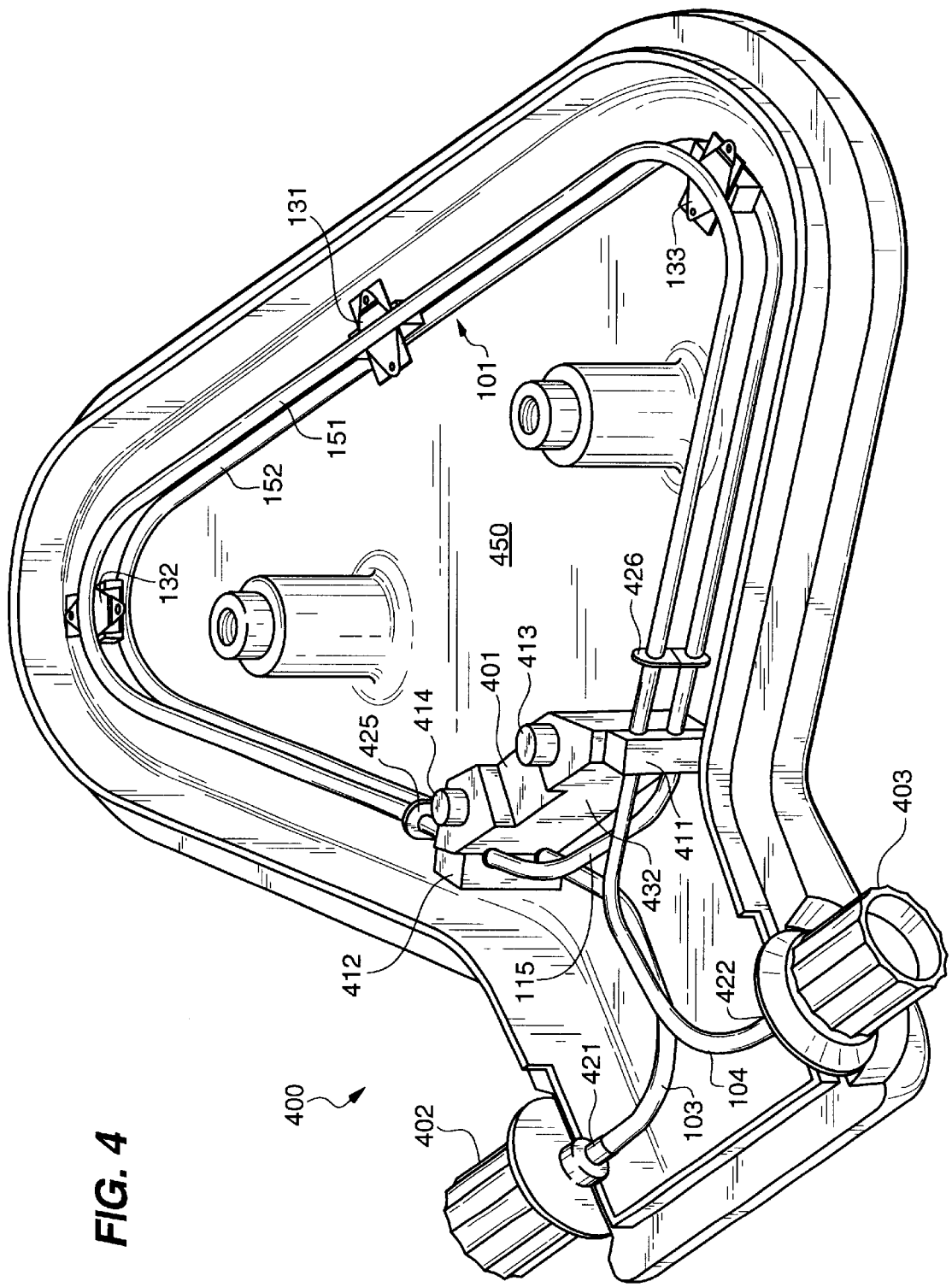
FIG. 4 discloses a top-side view of the complete flowmeter of the present invention with the top housing removed to expose the interior.

FIG. 4 illustrates a flowmeter 400 including flow tube 101, anchor 401 and housing base 450. Flow tube 101 is fixedly attached to anchor 401 at a location near cross-over section 115 of flow tube 101. Flow tube loops 151–152 extend from anchor 401 on one side of anchor 401. Crossover section 115 extends from anchor 401 on an opposite side of anchor 401. One way to attach loops 151–152 to anchor 401 is with blocks 411 and 412. Anchor 401 is formed with depressions corresponding to the outer diameter of flow tube 101. Likewise, blocks 411 and 412 are formed with corresponding depressions. During assembly, anchor 401, blocks 411–412 and flow tube 101 are brazed together to form a fixed, solid attachment between flow tube 101 and anchor 401 at the interfaces between anchor 401 and blocks 411–412. Anchor 401 is then welded to housing base 450 using bosses (not shown) corresponding to and oppositely arranged from bosses 413–414. During operation of flowmeter 400, the non-vibrating portion of flow tube 101 extends from face 432 of anchor 401 and the vibrating portion of flow tube 101 extends from the opposite face of anchor 401.

Inlet 103 of flow tube 101 is connected to adapter 402 with, preferably, an orbital weld at location 421. Outlet 104 of flow tube 101 is connected to adapter 403 with preferably an orbital weld at location 422. Since inlet 103 and outlet 104 are not part of the vibrating, dynamic portion of the flowmeter they can be arranged in any configuration. For example, inlet 103 and outlet 104 can be arranged so that planes F1–F2, with reference to FIG. 3, are perpendicular to the pipeline to which the flowmeter is connected. Another alternative is to arrange inlet 103 and outlet 104 so that flowmeter 400 is self-draining. Driver 131 and sensors 132–133 are arranged, and operate, as described with respect to FIG. 1. Brace bars 425–426 are fixedly attached between loops 151–152 of flow tube 101.

Figure 9:
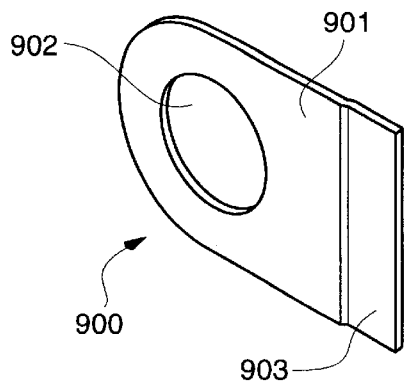
FIG. 9 depicts a brace bar half.
Figure 10:
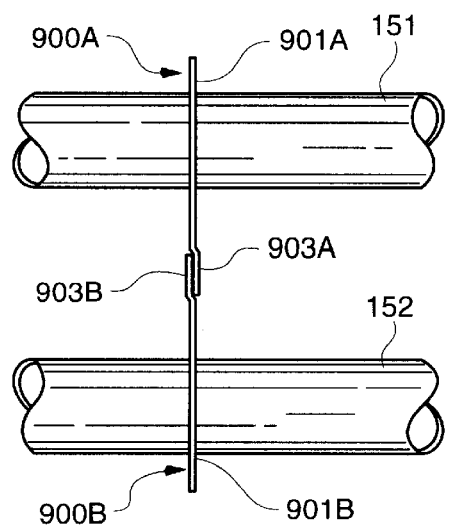
FIG. 10 depicts a portion of two flow tube loops and interconnecting brace bar halves.

Brace Bars—FIGS. 9–10

FIGS. 9–10 depict the preferred embodiment of brace bars 425–426. Each of brace bars 425–426 is comprised of two brace bar halves 900. Each brace bar half 900 has a body 901 and an overlap tab 903. In addition, each brace bar half 900 has a hole 902 through which flow tube 101 passes. FIG. 10 depicts the manner in which two brace bar halves 900 are connected to form a single brace bar 425 or 426. Brace bar half 900A having body 901A and overlap tab 903A is positioned on flow tube loop 151. Likewise, brace bar half 900B having body 901B and overlap tab 903B is positioned on flow tube loop 152. Overlap tab 903A and overlap tab 903B overlap one another and are tack-welded in the region of their 15 overlap. This forms a solid, one piece brace bar between flow tube loops 151 and 152. Brace bars 425–426 are each comprised from two brace bar halves 900, as just described.

Forming each brace bar 425–426 from two brace bar halves 900 allows significant flexibility in assembly of the flowmeter of the present invention. The brace bar halves 900 are threaded onto flow tube 101 at any time prior to the attachment of flow tube 101 to adapters 402–403. Flow tube 101 can be further processed before the brace bar half pairs are welded together to form complete, solid brace bars.

Figure 7:
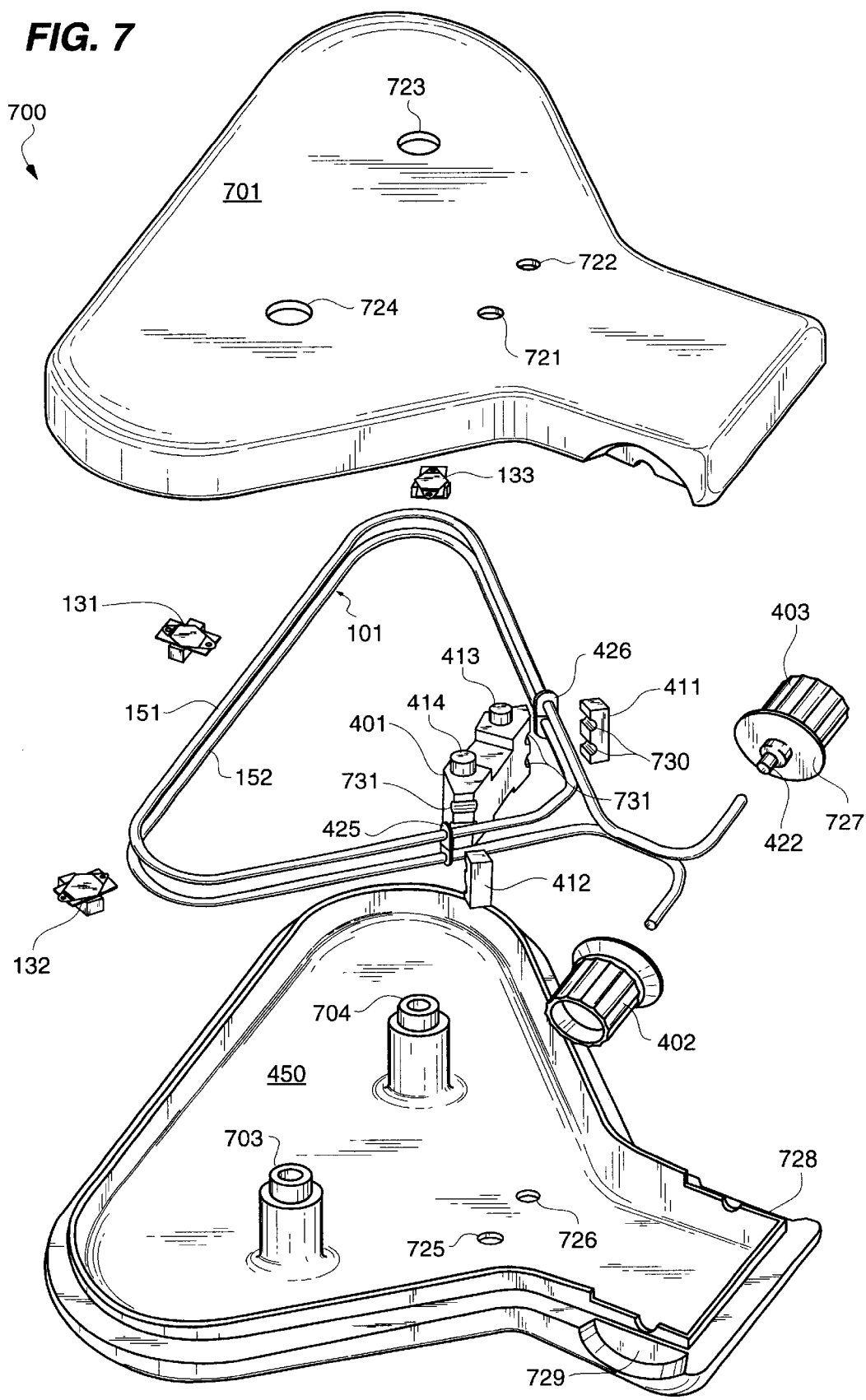
FIG. 7 discloses an assembly view of the preferred embodiment of the Coriolis flowmeter of the present invention.
Figure 8:
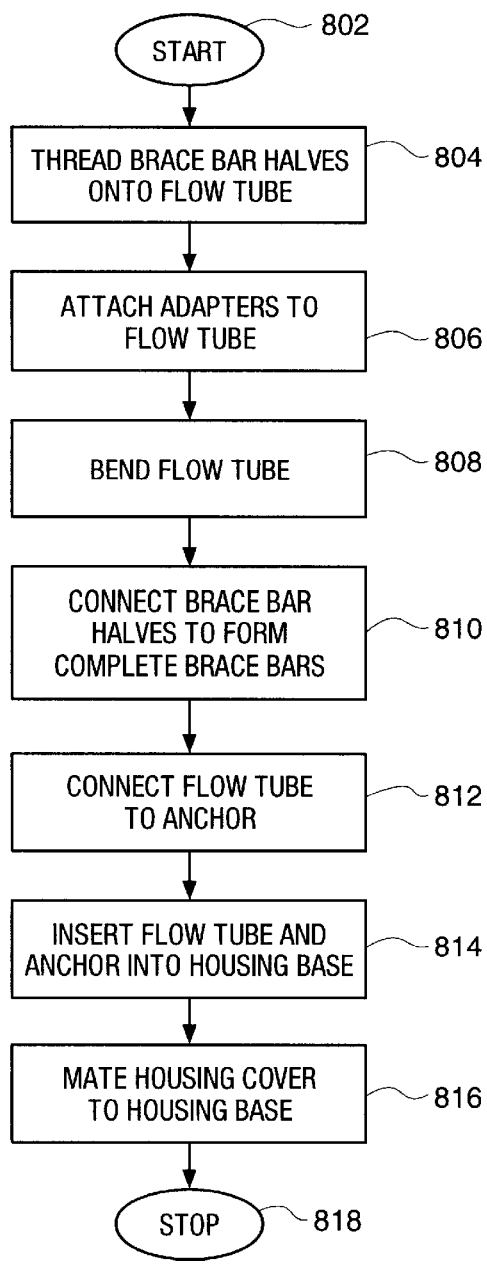
FIG. 8 is a process flow chart illustrating the steps for manufacturing a flowmeter according to the present invention.

Flowmeter Assembly—FIGS. 7–8

FIG. 7 is an exploded view of the complete flowmeter 700 including housing cover 701, housing base 450 and the remaining components as described below. Housing cover 701 has holes 721–722 which mate with bosses 414 and 413, respectively. Housing cover 701 also has holes 724–723 through which bosses 703–704 extend.

Adapters 402–403 attach to flow tube 101 using preferably orbital welds at points 421–422. Adaptor 403 has surface 727 that is welded to surface 728 on housing base 450 and housing cover 701. Adaptor 402 has a similar surface (not shown) that is welded to surface 729 on housing base 450. As described with respect to FIG. 9, brace bars 425–426 are each formed from two brace bar halves 900 which are welded to form a complete brace bar. Anchor 401 and anchor blocks 411–412 are brazed to flow tube 101 to form a solid attachment between flow tube 101 and anchor 401. Depressions 730 in blocks 411–412 and depressions 731 in anchor 401 are formed to cooperate with the outer diameter of tube loops 151–152. Anchor 401 has bottom bosses (not shown) which insert through holes 725–726 in housing base 450. Anchor 401 is welded to housing base 450 where the bottom bosses pass through holes 725–726. Bosses 413–414 and 703–704 are inserted through holes 722–721 and 723–724, respectively. Housing cover 701 and bosses 413–414 and 703–704 are welded together. Finally, housing base 450 is welded to housing cover 701 around the entire circumference of the mating edge between housing base 450 and housing cover 701.

Flow tube 101 is thereby coupled to the flowmeter housing and consequently the pipeline (not shown) through anchor 401 and adapters 402–403. Any stresses induced by the pipeline on flowmeter 700 are seen only by the non-vibrating portion of flow tube 101 below anchor 401. Thus the vibrating, active measurement portion of flow tube 101 is not effected by external forces, torques and vibrations. Anchor 401 is massive enough that it experiences minimal distortion when welded to housing base 450 and housing cover 701. This in turn means that flow tube 101 experiences minimal distortion as a result of the welding operations. Any distortion that does occur to flow tube 101 at least occurs equally to both loops 151–152 thereby minimizing any impact on the measurement performance of flowmeter 700.

Housing base 450 and housing cover 701 can be formed of thick enough material such that flowmeter 700 is capable of withstanding significant pressures. This is advantageous if flowmeter 700 is utilized in a pipeline in which flows highly pressurized materials. Should flow tube 101 rupture, the flowmeter housing is capable of containing the pressurized fluid. In the preferred embodiment of the present invention, housing cover 701 and housing base 450 are formed from steel by casting and provide secondary containment (rated to 500 pounds per square inch) for flowmeter 700. A feed-thru (not shown) is used to extend wiring from inside of flowmeter 700 to outside of flowmeter 700.

FIG. 8 depicts a flow chart illustrating the steps for the preferred method of fabricating the flowmeter of the present invention. The assembly process begins with element 802. During step 804 the brace bar halves are threaded onto the flow tube. The flow tube may already have been partially or completely bent prior to threading the brace bar halves onto the flow tube.

Once the brace bar halves are threaded on the flow tube the adapters are attached to the inlet and outlet of the flow tube during step 806. During step 808 the flow tube inlet and outlet and attached adapters are bent, if necessary to achieve the final configuration of the flow tube. In the preferred embodiment, the flow tube inlet and outlet are in-line with one another and in-line with the pipeline to which the flowmeter is attached. Therefore during step 808 the flow tube inlet and outlet are bent so that the adapters are in-line.

During step 810 the brace bar half pairs are welded to form solid brace bars. The solid brace bars can also be welded to the flow tube during this step or, alternatively, the brace bars are brazed to the flow tube during step 812.

A brazing operation is preferably performed during step 812. All the remaining necessary attachments to the flow tube are made during this step. This includes the anchor, brace bar brackets, pick-off sensor brackets and driver attachments to the flow tube. Alternatively, one could perform multiple welding operations to complete the necessary attachments to the flow tube. The result of this step is a complete flow tube assembly. The flow tube assembly includes the flow tube and everything in the completed flowmeter that is attached to the flow tube including the anchor, brace bars, adapters, driver brackets and pick-off sensor brackets.

During step 814 the flow tube assembly is inserted into the housing base. The anchor is then welded to the housing base. Any necessary internal wiring for the flowmeter is also completed during step 814.

During step 816 the flowmeter is completed by mating the housing cover to the housing base. The anchor is welded to the housing cover. The adapters are welded to the housing base and the housing cover. The housing base and housing cover are welded around the entire circumference of the housing to produce a housing providing secondary containment of pressure. Processing of the flowmeter then ends with element 818.

Figure 5:
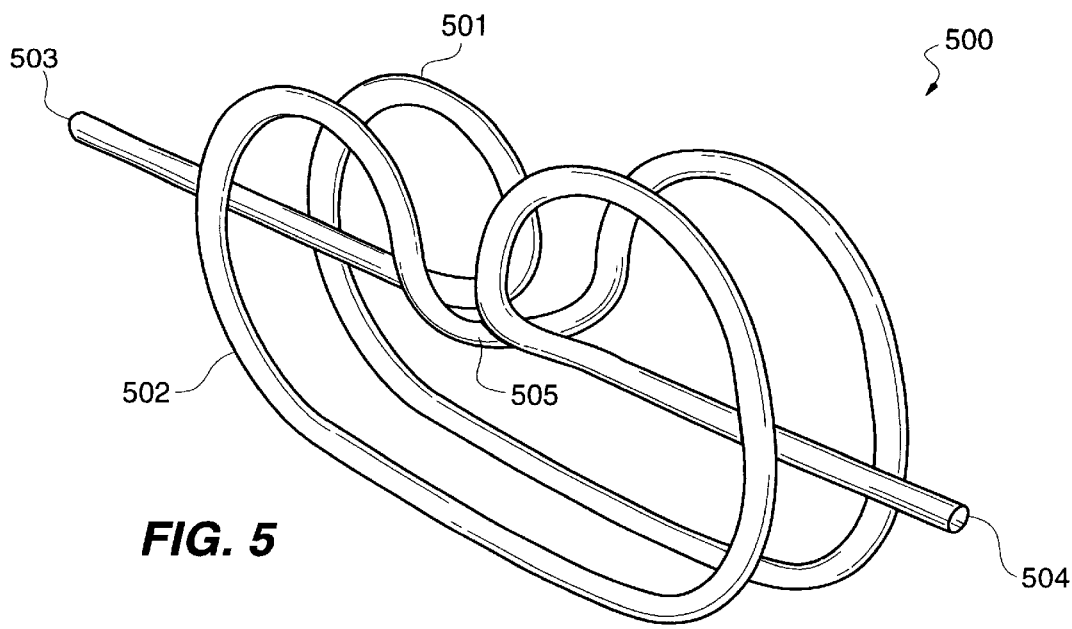
FIG. 5 discloses a flow tube of the present invention with b-shaped loops.
Figure 6:
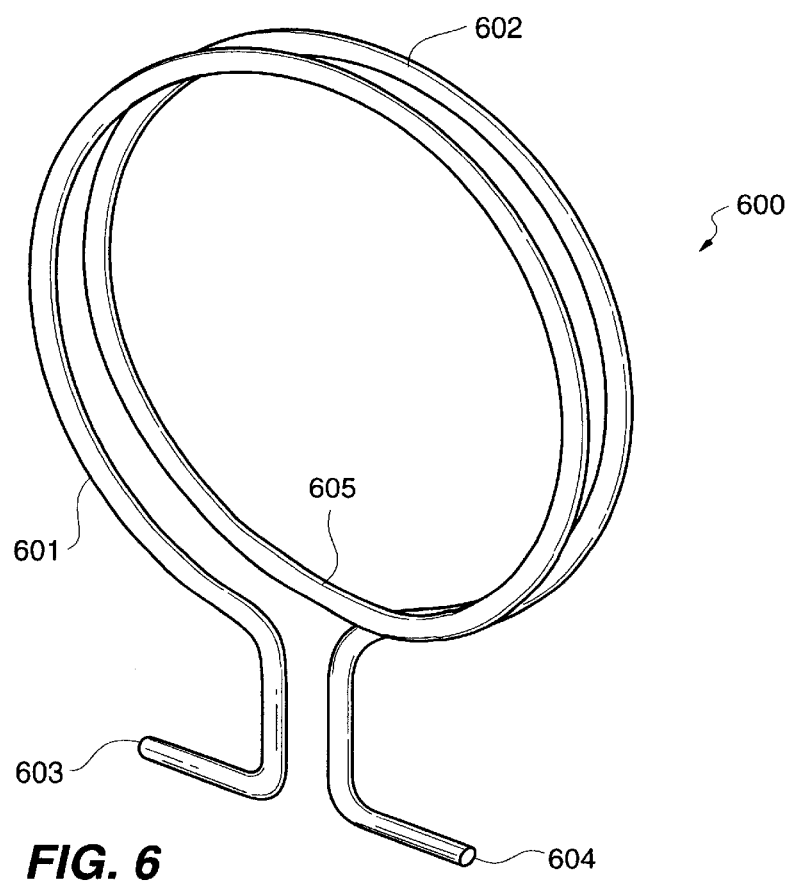
FIG. 6 discloses a flow tube of the invention with circular loops.

Alternative Embodiments—FIGS. 5–6

FIG. 5 illustrates alternatively shaped flow tube 500. Flow tube 500 has loops 501 and 502. Loops 501 and 502 are substantially B-shaped and are each contained in respective parallel planes. Inlet 503 is connected to a pipeline (not shown) at one end and to loop 501 at its other end. Inlet 503 bends to direct the fluid flow from the plane of the pipeline to the plane of loop 501. The fluid flowing through loop 501 is directed to loop 502 through crossover section 505. Fluid is then directed through loop 502 where it is directed back to the plane of the pipeline by outlet 504. Flow tube 500 shares the crossover section design of the flow tubes described with respect to FIGS. 1–4.

FIG. 6 illustrates a second alternatively shaped flow tube 600. Loops 601 and 602 are substantially circular and contained in respective parallel planes. Inlet 603 is connected to a pipeline (not shown) at one end and to loop 601 at its other end. Fluid flowing through flow tube 600 is directed from the plane of the pipeline to the plane of loop 601. The fluid then flows through loop 601 and is directed to loop 602 through crossover section 605. The fluid then flows through loop 602. Outlet 504 then returns the flowing fluid to the pipeline plane from plane of loop 152. Flow tube 600 shares the crossover section of the designs described with respect to FIGS. 1–5.

The present invention includes a dual loop, serial flow tube utilizing a complex bend to direct flow from a first loop to a second loop. The present invention also includes an anchor for securing the flow tube to a housing. The present invention includes a two-piece brace bar design and a method for assembling a flowmeter incorporating the features of the present invention. Although specific embodiments of the present invention are disclosed herein, it is expected that persons skilled in the art can and will design alternative dual loop, serial flow tube Coriolis flowmeters that are within the scope of the following claim either literally or under the doctrine of equivalents.

We claim:

1. A Coriolis flowmeter having a continuous serial path flow tube with dual loops, an inlet for receiving a flow of material from a connected pipeline and an outlet for returning said flow of material to said pipeline, a driver means for oscillating said dual loops of said flow tubes, sensor means for sensing oscillations in said loops of said flow tubes responsive to Coriolis forces applied on said loops by material flowing through said dual loops, and a housing enclosing said dual loops, said flowmeter comprising:
a continuous length of flow tube;
a first loop in said continuous length flow tube, oriented in a first plane, having a first end and a second end with said first end receiving said inflow from said inlet, wherein said first end and said second end have non-parallel longitudinal axes;
a second loop in said continuous length of flow tube oriented in a second plane having a first end and a second end with said second end of said second loop directing said flow to said outlet, wherein said first end and said second end of said second loop have nonparallel longitudinal axes;
a cross-over section in said continuous length of flow tube formed by a bend in said length of flow tube between said second end of said first loop and said first end of said second loop, wherein said cross-over section (115) directs flow from said first loop to said second loop;
brace bars connected to said first loop and said second loop to define an axis of vibration for said first and second loops; and
an anchor fixedly attached to said housing and to said first and second loops of said continuous length of flow tube between said brace bars and said cross-over section wherein said first loop and said second loop project outward from a first surface of said anchor, said continues length of flow tube extends through said anchor between said first and second loops and said cross-over section, and said cross-over section of said continuous length of flow tube projects outward from a second surface of said anchor.

2. The Coriolis flowmeter of claim 1 wherein said first plane and said second plane are substantially parallel.

3. The Coriolis flowmeter of claim 1 wherein said first loop and said second loop are substantially triangular shaped.

4. The Coriolis flowmeter of claim 1 wherein said cross-over section redirects said flow substantially 90-degrees from said first loop to said second loop.

5. The Coriolis flowmeter of claim 4 wherein said inlet of said continuous length of flow tube is oriented in an inlet plane and said flowmeter further comprises an inlet bend of said continuous length of flow tube curved to direct said flow from said inlet in said inlet plane to said first loop in said first plane.

6. The Coriolis flowmeter of claim 4 wherein said outlet of said continuous length of flow tube is oriented in an outlet plane and said flowmeter further comprises an outlet bend of said continuous length of flow tube curved to direct flow from said second loop in said second plane to said outlet in said outlet plane.

7. The Coriolis flowmeter of claim 4 further comprising:
a first angled section of said first loop between a first substantially straight section and a second substantially straight section of said first loop;
a second angled section of said first loop between said second substantially straight section and a third substantially straight section of said first loop;
a first angled section of said second loop between a first substantially straight section and a second substantially straight section of said second loop; and
a second angled section of said second loop between said second substantially straight section and a third substantially straight section of said second loop.

8. The Coriolis flowmeter of claim 7 wherein said first angled section and said second angled section of said first loop and said second loop form substantially 45 degree curvatures of said continuous length of flow tube.

9. The Coriolis flowmeter of claim 1 wherein said first loop and said second loop are substantially B-shaped.

10. The Coriolis flowmeter of claim 9 wherein said inlet of said continuous length of flow tube is oriented in an inlet plane and said flowmeter further comprises an inlet bend of said continuous length of flow tube curved to direct flow from said inlet in said inlet plane to said first loop in said first plane.

11. The Coriolis flowmeter of claim 9 wherein said outlet is oriented in an outlet plane and said flowmeter further comprises an outlet bend curved to direct flow from said second loop in said second plane to said outlet in said outlet plane.

12. The Coriolis flowmeter of claim 1 wherein said first loop and said second loop are substantially circular.

13. The Coriolis flowmeter of claim 12 wherein said inlet of said continuous length of flow tube is oriented in an inlet plane and said flowmeter further comprises an inlet bend curved to direct flow from said inlet in said inlet plane to said first loop in said first plane.

14. The Coriolis flowmeter of claim 12 wherein said outlet of said continuous length of flow tube is oriented in an outlet plane and said flowmeter further comprises an outlet bend curved to direct flow from said second loop in said second plane to said outlet in said outlet plane.

15. The Coriolis flowmeter of claim 1 further comprising:
a first adaptor fixedly attached to said inlet of said continuous length of flow tube for connecting said inlet to said housing and for receiving a flow of fluid from said pipeline to said inlet; and
a second adaptor fixedly attached to said outlet of said continuous length of flow tube for connecting said outlet to said housing and for delivering a flow of fluid from said outlet to said pipeline.

16. The Coriolis flowmeter of claim 1 wherein said anchor comprises:
an anchor base having a first end fixedly attached to and formed to complement the outer diameter of said first end of said first loop and said first end of said second loop and a second end fixedly attached to and formed to complement the outer diameter of said second end of said first loop and said second end of said second loop, said anchor base fixedly attached to said housing;
a first tube attachment block fixedly attached to and formed to complement the outer diameter of said first end of said first loop and said first end of said second loop, said first tube attachment block being fixedly attached to said first end of said anchor base; and
a second tube attachment block fixedly attached to and formed to complement the outer diameter of said second end of said first loop and said second end of said second loop and, said second tube attachment block (411) being fixedly attached to said second end of said anchor base (401).

17. The Coriolis flowmeter of claim 1 wherein said housing comprises:
a housing base fixedly attached to a first welded face of said anchor; and
a housing cover fixedly attached to a second welded face of said anchor and fixedly attached at its circumference to said housing base to form a sealed chamber within said housing.

18. The Coriolis flowmeter of claim 17 wherein said housing base and said housing cover are formed to contain a positive pressure when fixedly attached together.

19. The Coriolis flowmeter of claim 1 wherein said anchor is formed from a material different than the material of said continuous length of flow tube.

20. The Coriolis flowmeter of claim 1 wherein said brace bars include:
 a first brace bar half fixedly attached to said first loop and extending toward said second loop;
 a second brace bar half fixedly attached to said second loop and extending toward said first loop; and
 said first brace bar half and said second brace bar half being fixedly attached to one another where said first brace bar half and said second brace bar half overlap one another.

* * * * *